(12) United States Patent
Gentner

(10) Patent No.: US 7,744,029 B2
(45) Date of Patent: Jun. 29, 2010

(54) BELT SPOOL

(75) Inventor: Bernd Gentner, Ellwangen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 12/287,118

(22) Filed: Oct. 6, 2008

(65) Prior Publication Data

US 2009/0101744 A1    Apr. 23, 2009

(30) Foreign Application Priority Data

Oct. 17, 2007   (DE) ............... 10 2007 049 663

(51) Int. Cl.
   *B65H 75/48* (2006.01)
(52) U.S. Cl. ............ 242/379.1; 280/805; 297/471
(58) Field of Classification Search ............ 242/379.1; 280/805; 297/471, 472
   See application file for complete search history.

(56) References Cited

U.S. PATENT DOCUMENTS

| | | | | |
|---|---|---|---|---|
| 3,881,667 A * | 5/1975 | Tandetzke | ............... | 242/384.3 |
| 3,952,967 A * | 4/1976 | Barile et al. | ............... | 242/379.1 |
| 4,323,205 A * | 4/1982 | Tsuge et al. | ............... | 242/379.1 |
| 5,836,534 A * | 11/1998 | Bohmler | ............... | 242/379.1 |
| 5,967,441 A * | 10/1999 | Kohlndorfer et al. | ...... | 242/379.1 |
| 5,984,223 A * | 11/1999 | Hiramatsu | ............... | 242/379.1 |
| 6,382,548 B1 * | 5/2002 | Nishizawa et al. | ....... | 242/379.1 |
| 6,986,480 B2 | 1/2006 | Blum et al. | | |
| 7,354,014 B2 * | 4/2008 | Hiramatsu | ............... | 242/379.1 |
| 7,410,114 B2 * | 8/2008 | Webber et al. | ........... | 242/379.1 |
| 2004/0262441 A1 * | 12/2004 | Hiramatsu | ............... | 242/379.1 |
| 2006/0022447 A1 * | 2/2006 | Kohlndorfer et al. | ........ | 280/805 |
| 2006/0131456 A1 * | 6/2006 | Romero | ............... | 242/382 |

FOREIGN PATENT DOCUMENTS

| | | |
|---|---|---|
| DE | 19727083 | 1/1998 |
| DE | 29912024 | 12/1999 |
| DE | 10343534 | 4/2004 |
| GB | 2389343 | 12/2003 |
| WO | 9905057 | 2/1999 |

* cited by examiner

*Primary Examiner*—Sang Kim
(74) *Attorney, Agent, or Firm*—Tarolli, Sundheim, Covell & Tummino LLP

(57) ABSTRACT

A belt spool comprising a spool body and a torsion rod having a first end and a second end, the torsion rod being provided with a torque transmission profile at the first end, in order to be coupled with the spool body, a transmission element being connected with the torque transmission profile of the torsion rod, and a stop element cooperating with the transmission element and being coupled with the spool body.

14 Claims, 10 Drawing Sheets

BELT SPOOL

TECHNICAL FIELD

The invention relates to a belt spool for a belt retractor.

BACKGROUND OF THE INVENTION

Belt retractors with force limiters are known from the prior art, which make possible a rotation of the belt spool despite a blocking thereof, when a specific belt webbing withdrawal force is exceeded in the safety belt. The forces exerted by the safety belt onto a vehicle occupant are thereby limited.

In particular, torsion rods are used as force limiters, in which the resistance force counteracting the withdrawal of the belt webbing is determined by the respectively acting moment of torsion resistance. Such torsion rods can only transfer a moment of resistance to a limited extent, because in the case of higher stresses they tend to contract or to collapse completely.

The object of the invention consists in providing an assembly for force limitation in a belt retractor, in which a later addition of a torsion rod or of another desired force limiter is possible.

BRIEF SUMMARY OF THE INVENTION

This is achieved in a belt spool comprising a spool body and a torsion rod having a first end and a second end, the torsion rod being provided with a torque transmission profile at the first end, in order to be coupled with the spool body, a transmission element being connected with the torque transmission profile of the torsion rod, and a stop element cooperating with the transmission element and being coupled with the spool body.

According to the invention, the torsion rod with its torque transmission profile is coupled to the spool body via the transmission element so that a rotation of the belt spool relative to the torsion rod is possible to a limited extent, without the torsion rod twisting. The torsion rod is made of a "soft" material and twists after a specific torque. Owing to the torque transmission element and the transmission element which is made of a harder material than the torsion rod, the spool body can rotate relative to the torsion rod until the transmission element lies against the stop element, i.e. until one end of the torsion rod is coupled so as to be locked against relative rotation with the spool body. The material of the torsion rod is designated here as being "soft" because it is softer than the material of the transmission element and of the spool body, and the "soft" torsion rod is twisted after a specific force.

The torque transmission profile is preferably a multi-groove profile. The multi-groove profile allows a translatory movement of the transmission element relative to the spool body, without the torsion rod being twisted.

The spool body comprises for example a mounting and the stop element comprises an outer side, the stop element is being provided with a multi-groove profile on the outer side and is inserted into the mounting. The stop element could equally well be part of the spool body.

The spool body has an end side and the stop element is, for example, a cover which is mounted on the end side of the spool body. The cover can be mounted by fastening means in different positions on the spool body. The number of degrees that the spool body can move relative to the torsion rod until the torsion rod is coupled to the spool body can be set by means of the positions of the cover and, connected therewith, of the stop which is mounted thereon.

Alternatively, the stop element can be a rod which is inserted into a mounting in the spool body. The rod can be pressed into the spool body or can be cast onto the spool body.

The transmission element can be a threaded bush which is provided with an outer thread engaging the stop element. The spool body can move relative to the torsion rod until the transmission element lies against the stop element. On rotation of the spool body and the stop element connected therewith, the transmission element moves in a translatory manner, "screwing itself into" the stop element.

Alternatively, the transmission element can have a stop which is able to cooperate with a stop on the stop element. As soon as the two stops lie against each other, the torsion rod is coupled to the spool body, so that a rotation of the spool body relative to the torsion rod is no longer possible and the torsion rod can be twisted.

The torsion rod is preferably a first force limiter and second force limiter is provided functionally between the torque transmission profile of the torsion rod and the spool body. A force limitation therefore takes place by means of the second force limiter until the transmission element lies against the stop element.

The second force limiter can be realized by a self-tapping thread which impresses itself into a part, producing a corresponding counter-thread.

The second force limiter can also be formed by a cutting member which removes material by cutting. The cutting member can be arranged, for example, at the stop of the transmission element.

Alternatively, a fluid can be provided, which serves as a second force limiter.

Further features and advantages will be apparent from the sub-claims.

DETAILED DESCRIPTION OF THE PREFERRED EMBODIMENTS

Figure 1:
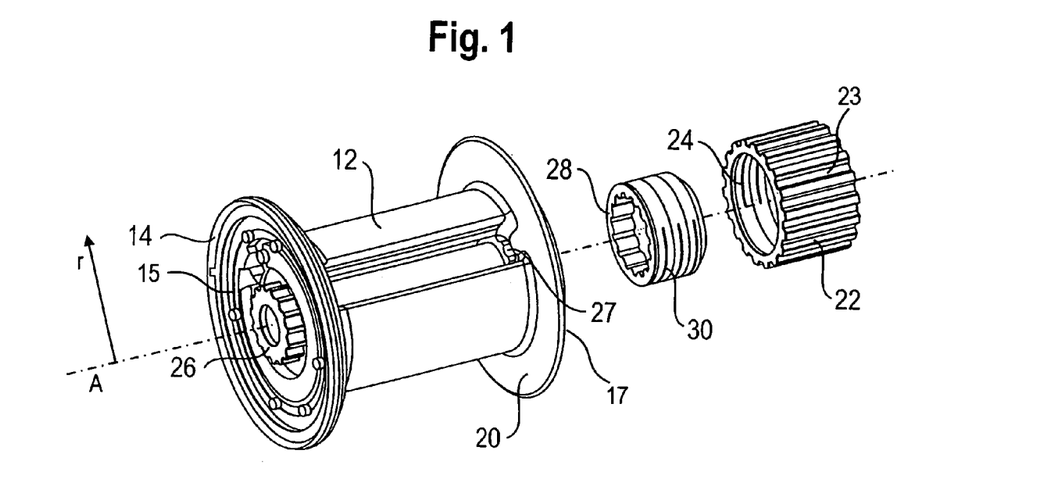
FIG. 1 shows a perspective view of a belt spool according to the invention in accordance with a first embodiment.
Figure 2:
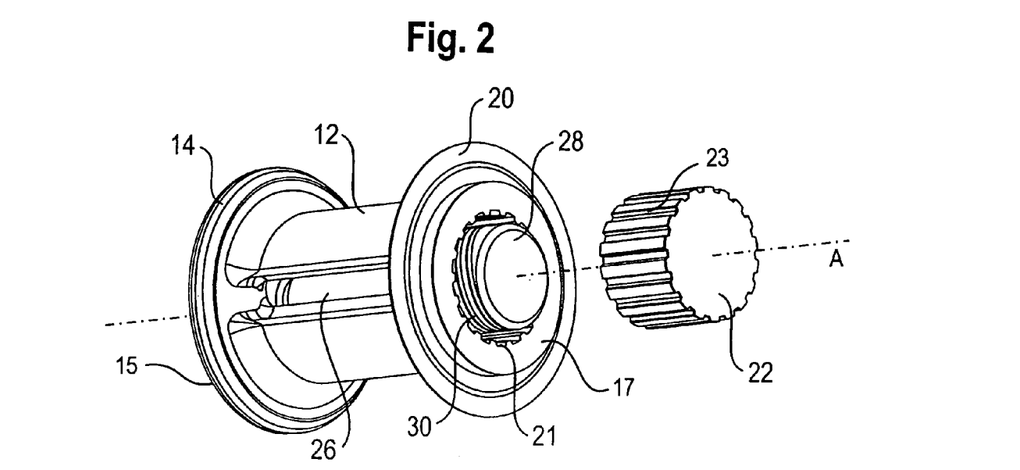
FIG. 2 shows a further perspective view of the belt spool of FIG. 1.
Figure 3:
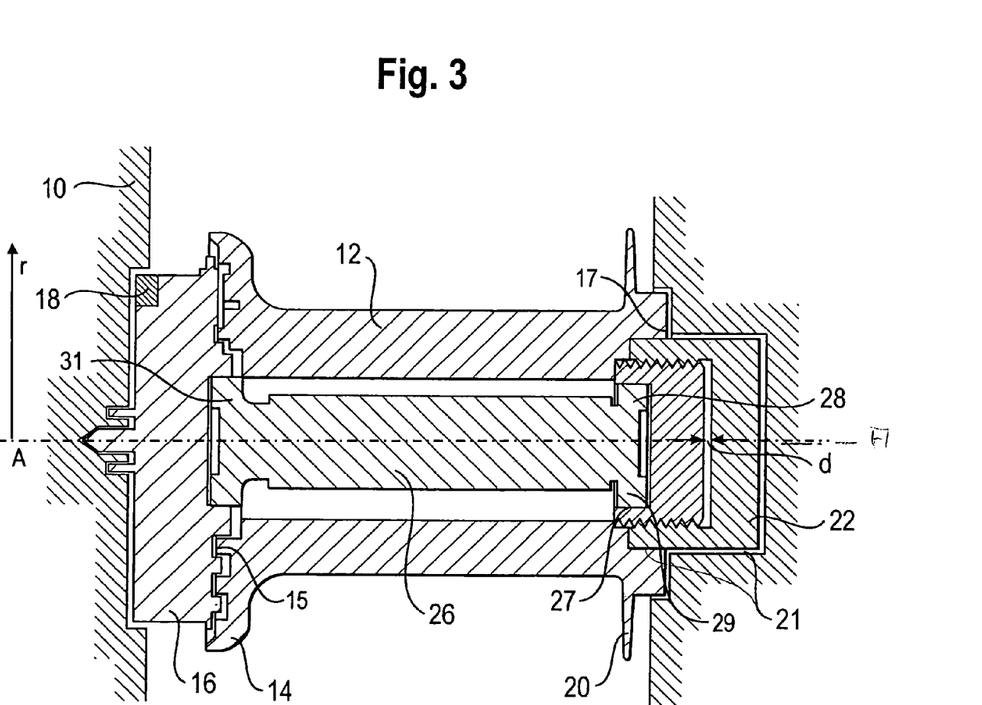
FIG. 3 shows a view, partially in section, of the belt spool of FIGS. 1 and 2 and of a part of a belt retractor, in which the belt spool is mounted in the belt retractor.
Figure 4:
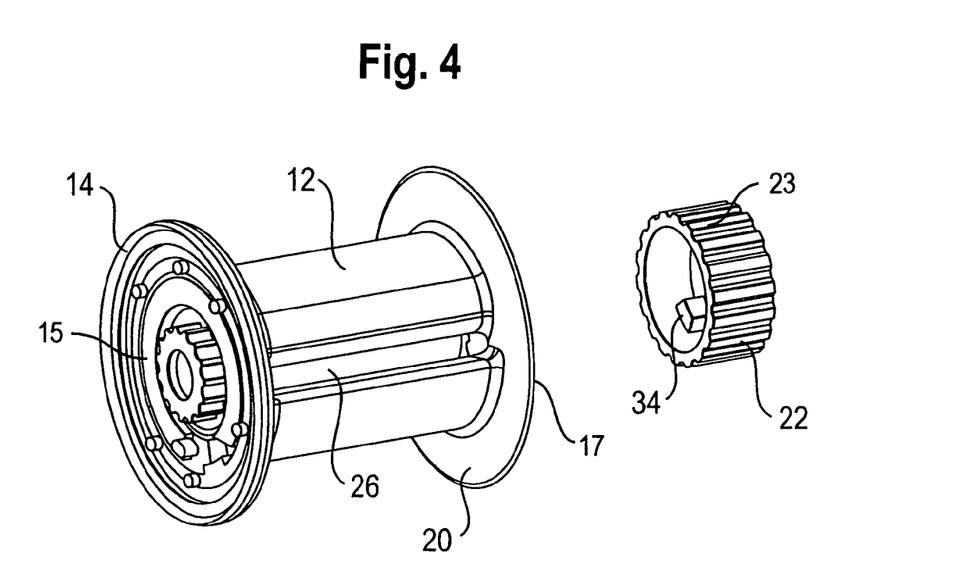
FIG. 4 shows a perspective view of a belt spool according to the invention in accordance with a second embodiment.
Figure 5:
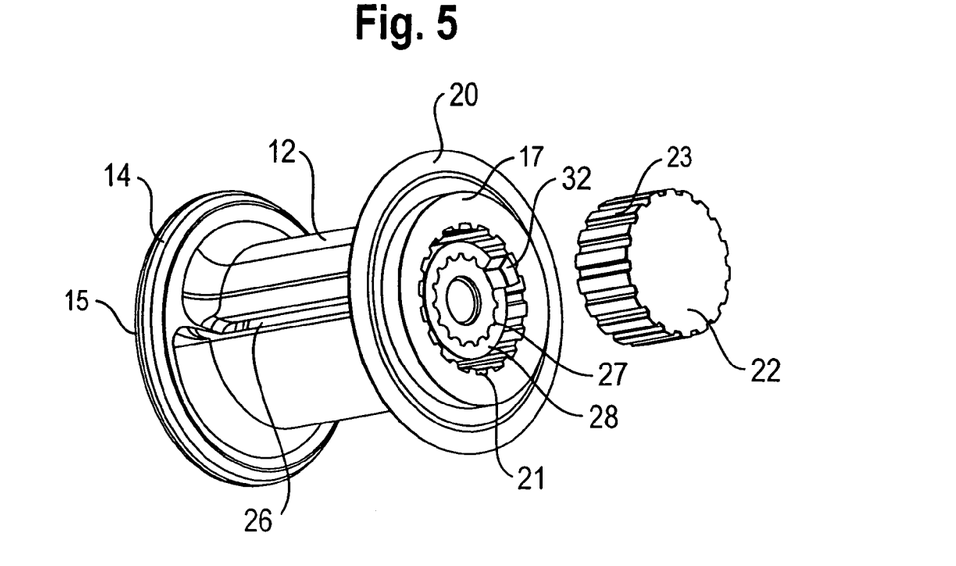
FIG. 5 shows a further perspective view of the belt spool of FIG. 4.

A belt spool 8 is shown in FIGS. 1 to 3. The belt spool 8 is mounted rotatably with respect to an axial direction A in a frame 10 (FIG. 3) and has a spool body 12. Belt webbing (not shown) can be withdrawn from the belt spool 12 or wound. The spool body has a first, left-hand flange 14 an a second, right-hand flange 20 (with respect to FIG. 3) extending to a radial direction r. The left-hand flange 14 has a end side 15, the right-hand flange 20 has an end side 17.

A disc 16 is placed on the end side 15 of the left-hand flange 14 of the spool body 12, which disc 16 can rest so as to be locked against relative rotation on the frame 10 by means of a blocking mechanism 18 which is shown diagrammatically. The disc 16 can be connected by means of shear pins, which are not shown, so as to be locked against relative rotation with the flange 14 of the spool body 12 up to a certain torque.

A mounting 21, into which a stop element 22 is inserted, is provided on the end side 17 of the right-hand flange 20 of the spool body 12. The stop element comprises an outer side 23. Both the mounting 21 and also the outer side 23 of the stop element 22 have a corresponding multi-groove profile. The stop element 22 is thus coupled with the spool body 12 so as to be locked against relative rotation. The stop element 22 has an inner thread 24 (see FIG. 1). Although the stop element 22 is shown here as a separate component, it could also be part of the spool body 12, i.e. the spool body 12 itself could have the inner thread.

A torsion rod 26 is arranged in the hollow interior of the belt spool 12. The torsion rod 26 has a first, right-hand axial end 29 and a second, left-hand axial end 31 (with respect to FIG. 3). The torsion rod 26 is coupled at its first end 29 with the disc 16 so as to be locked against relative rotation.

At its first end 29, the torsion rod 26 has a torque transmission profile 27 in the form of a multi-groove profile. The torsion rod 26 is connected with a transmission element 28 via the torque transmission profile 27. A torque can be transmitted between the spool body 12 and the torsion rod 26 by means of the torque transmission profile 27 and the transmission element 28. Although the torsion rod 26 is formed from a "soft" material, the spool body 12 can rotate relative to the torsion rod 26, i.e a torque can occur at the transmission element 28 and at the torsion rod 26, without the torsion rod 26 being twisted. The material of the torsion rod 26 is designated here as "soft" because the torsion rod is twisted after a specific force and the material is softer than the material of the spool body 12 and of the transmission element 28.

The transmission element 28 is a threaded bush which is provided with an outer thread 30. The outer thread 30 of the threaded bush is adapted to the inner thread 24 of the stop element 22.

The transmission element 28 can move, together with the torsion rod 26 connected therewith, in a limited translatory manner relative to the stop element 22 and the spool body 12 which is connected therewith, namely by the distance d (see FIG. 3).

The mode of operation of the belt spool 8 is described in detail below: When, with a blocked disc 16, the torque which is acting on the spool body 12 due to the tractive forces acting in the safety belt is greater than a particular force, the shear pins which connect the disc 16 with the spool body 12 break. When the torque is in addition greater than a force which is necessary in order to rotate the stop element 22 relative to the transmission element 28, the spool body 12 rotates with the transmission element 28 approaching the stop element 22, i.e. the transmission element 28 is "screwed into" the stop element 22. As the second end 31 of the torsion rod 26 is connected with the blocked disc 16 so as to be locked against relative rotation, this end remains in its position. As the first end 29 of the torsion rod 26 is held in the transmission element 28, the transmission element 28 moves together with the torsion rod 26 in a translatory manner relative to the stop element 22 and to the spool body 12. Due to the connection of the torsion rod 26 via the multi-groove profile, i.e. the torque transmission profile 27, and the transmission element 28, this is not twisted. The transmission element 28 is in fact made of a harder material than the torsion rod 26 and receives the acting forces.

As soon as the transmission element 28, i.e. the threaded bush, has been moved by the distance d and lies against the stop element 22, the first end 29 of the torsion rod is connected so as to be locked against relative rotation with the stop element 22 and with the spool body 12. The torque can be transmitted via the transmission element 28 and the torque limiting profile 27 of the torsion rod 26. With a further loading of the spool body 12, the torsion rod 26 is therefore twisted, and a torsion of the torsion rod 26 occurs.

The distance d which the transmission element 28 can move relative to the stop element 22, establishes the rotation range about which the spool body 12 can be rotated without force limitation by the torsion rod 26.

The transmission element 28 is therefore held so as to be movable to a limited extent in the stop element 22 and therefore movable to a limited extent to the spool body 12. The force limitation of the torsion rod 26 therefore only takes place after a particular rotation of the spool body 12, namely only when the transmission element 28 lies against the stop element 22.

The outer thread 30 of the transmission element 28 can also be constructed so as to be self-tapping, so that a force limitation takes place by means of cutting, when the transmission element 28 moves relative to the stop element 22. A second force limiter is then provided between the transmission element 28 and the spool body 12.

A second embodiment is shown in FIGS. 4 to 8. The same reference numbers are used for the components known from the first embodiment, and reference is made in this respect to the above explanations.

The first end 29 of the torsion rod 26 (with respect to FIG. 6) again has a torque transmission profile 27 in the form of a multi-groove profile. The transmission element 28 is cap-shaped and has a stop 32 which protrudes in the axial direction. A stop 34 corresponding to the stop 32 is formed on the stop element 22 which is connected with the spool body 12 so as to be locked against relative rotation, which stop 34 protrudes in the axial direction towards the transmission element 28.

Figure 7:
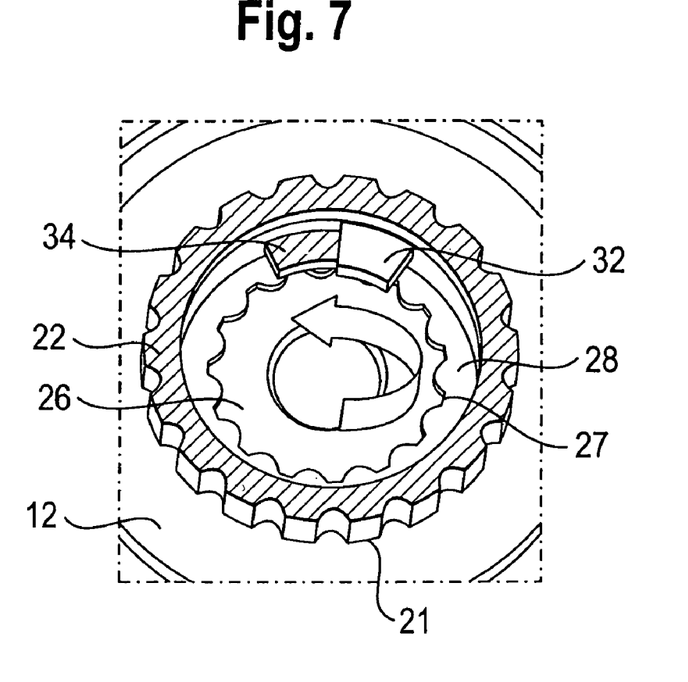
FIG. 7 shows a diagrammatic view of a part of FIG. 6 with a stop in its initial position.
Figure 8:
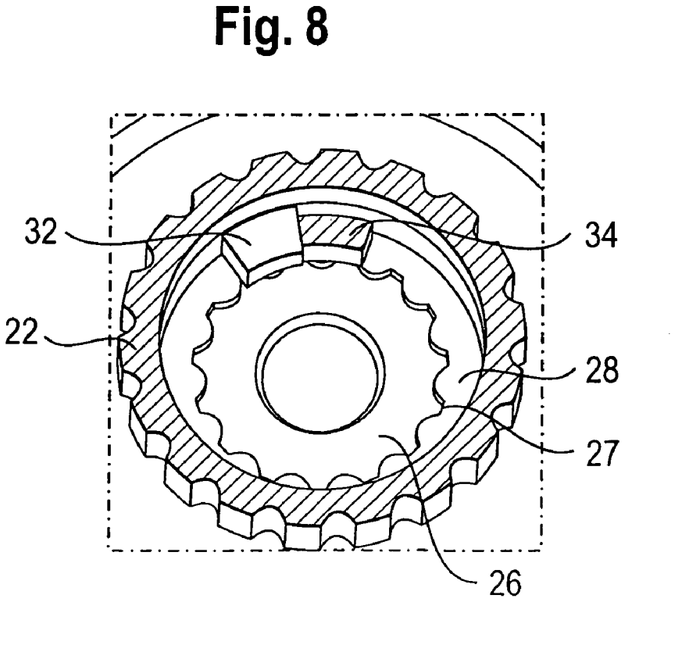
FIG. 8 shows a view corresponding to FIG. 7, with the stop in its coupling position.
Figure 9:
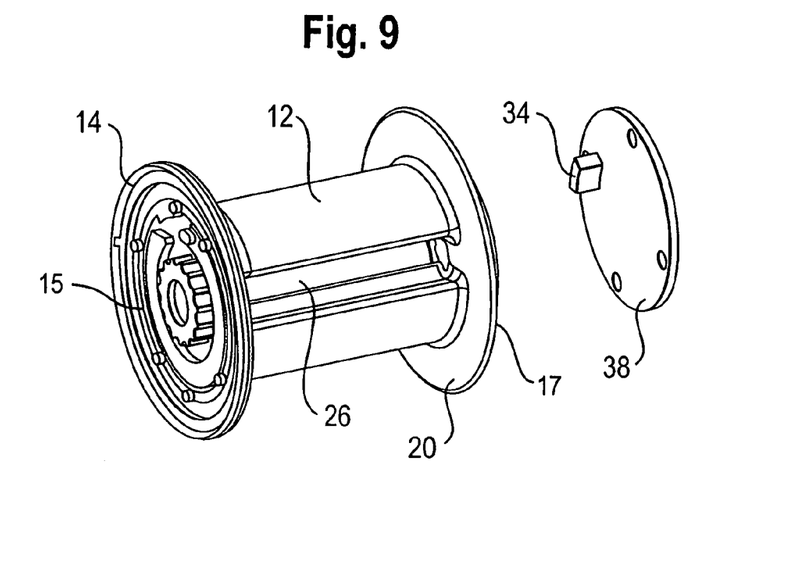
FIG. 9 shows a perspective view of a belt spool according to the invention in accordance with a third embodiment.
Figure 10:
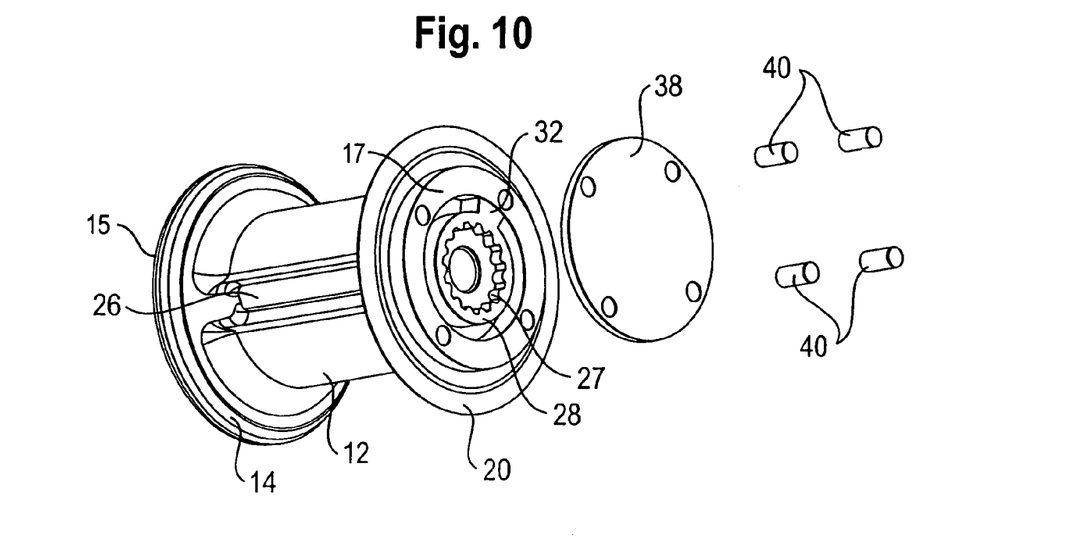
FIG. 10 shows a further perspective view of the belt spool of FIG. 9.
Figure 11:
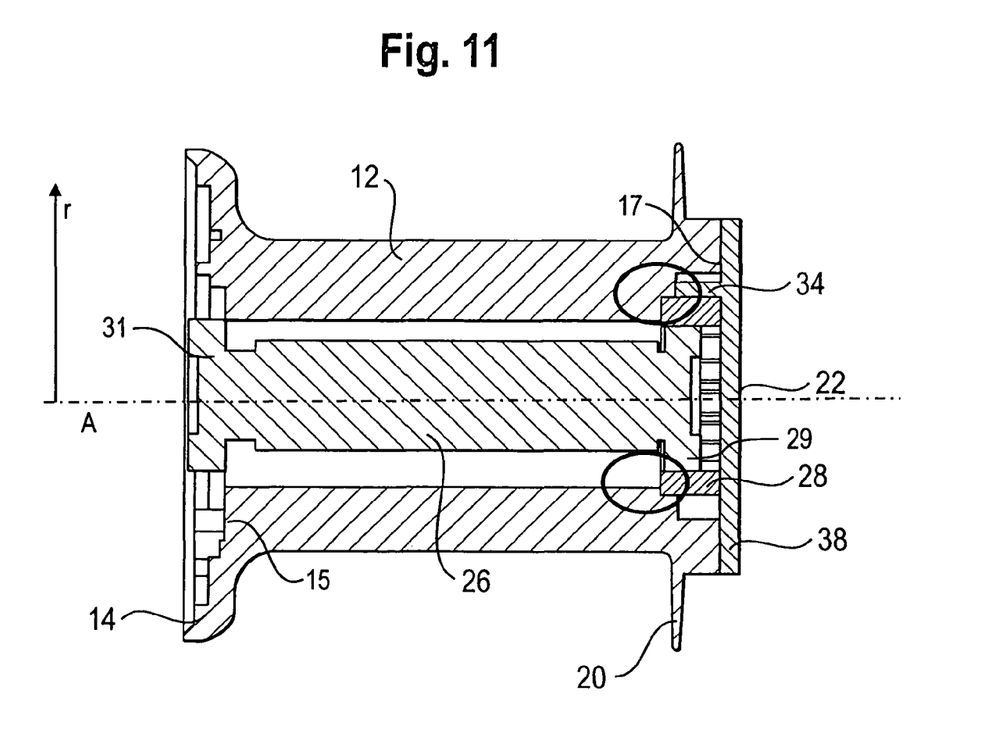
FIG. 11 shows a view of the belt spool of FIGS. 9 and 10.
Figure 12:
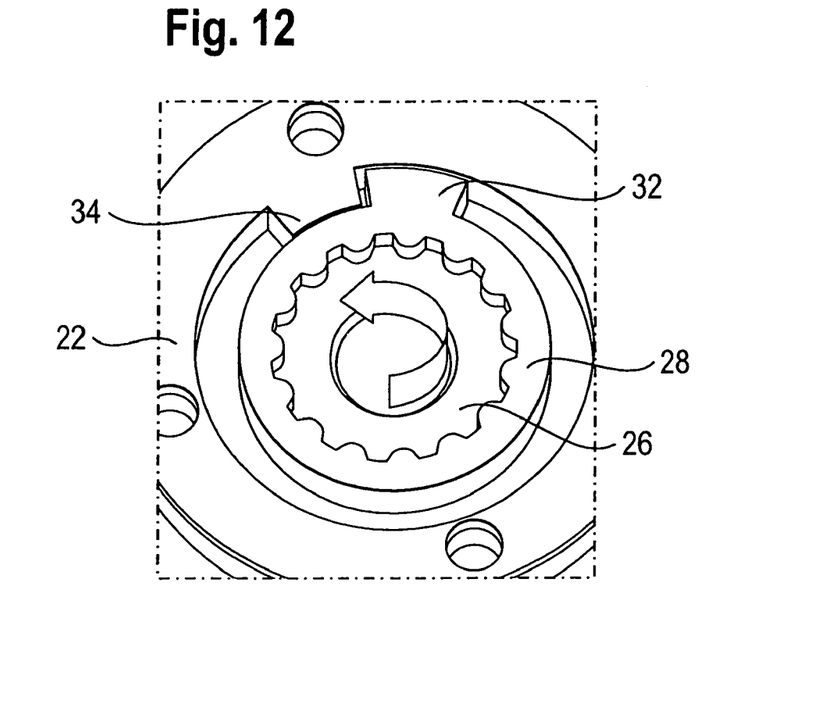
FIG. 12 shows a diagrammatic view of the belt spool of FIGS. 9 to 11 with a stop in its initial position.
Figure 13:
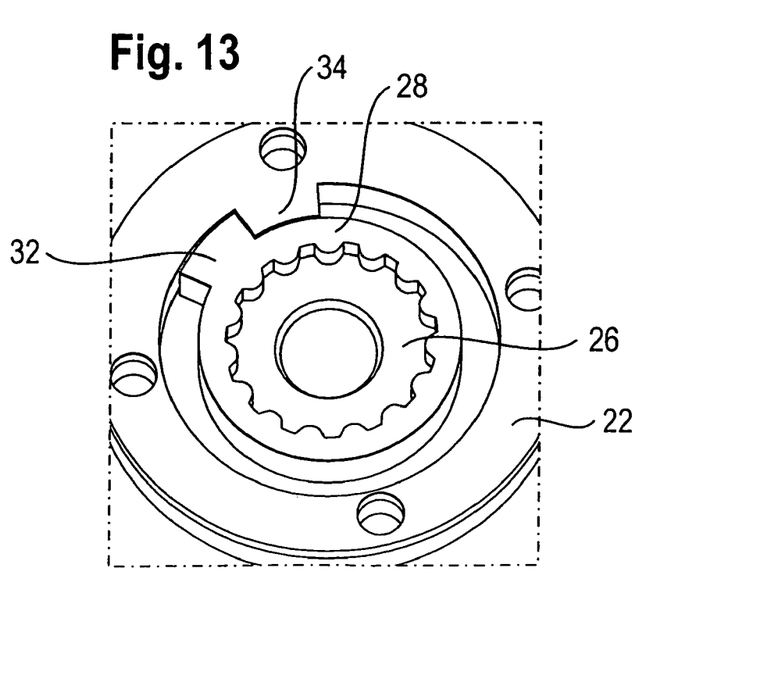
FIG. 13 shows the view corresponding to FIG. 12, with the stop in its coupling position.

FIG. 7 shows how the transmission element 28 initially (i.e. when the disc 16 is not blocked and no tractive force is acting on the belt spool 12 with a blocked disc 16) is positioned relative to the stop 34 on the stop element 22. The two stops 32, 34 therefore lie against each other so that after the blocking of the disc 16 and a tractive force acting in the safety belt onto the spool body 12, the spool body 12 can move through approximately 300° (with respect to FIG. 7) anticlockwise relative to the torsion rod 26, until the stop 34 of the stop element 22 lies against the stop 32 of the transmission element 28.

As soon as the two stops 32, 34 lie against each other and a further tractive force occurs acting on the spool body 12, the torsion rod 26 is twisted. Through the abutment of the two stops 32, 34 against each other, the first end 29 of the torsion rod 26 (with respect to FIG. 6) is in fact coupled with the spool body 12 so as to be locked against relative rotation. The position in which the stop 34 is then situated is therefore also designated as the coupling position.

The torsion rod 26 is therefore not twisted initially and a force limitation by means of torsion only takes place after the two stops 32, 34 lie against each other.

Figure 6:
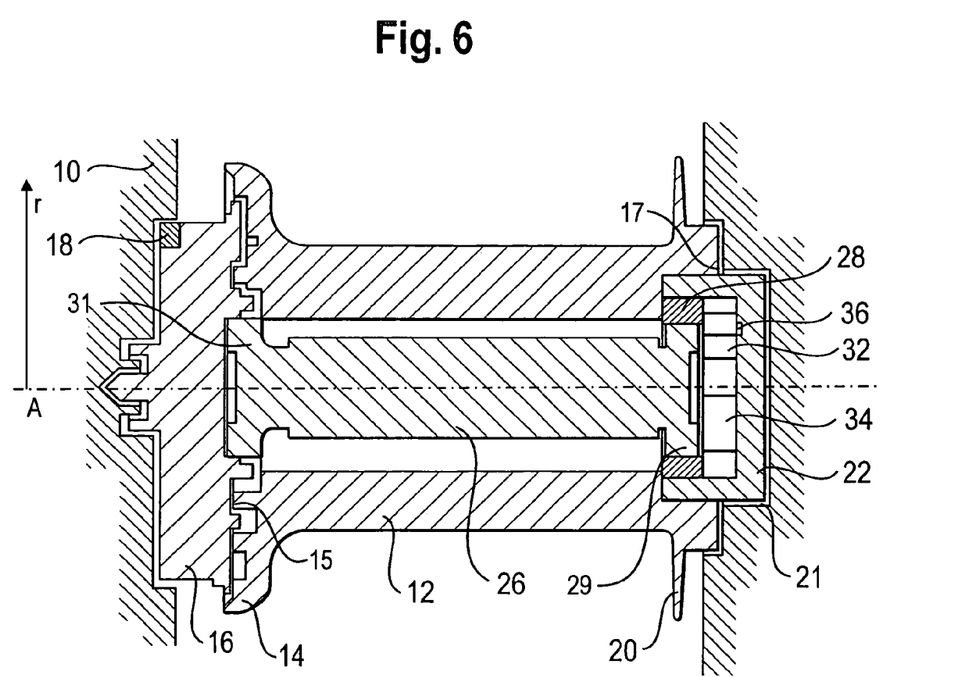
FIG. 6 shows a view, partially in section, of the belt spool of FIGS. 4 and 5 and of a part of a belt retractor, in which the belt spool is mounted in the belt retractor.

A cutting member 36 can be provided (shown diagrammatically in FIG. 6). This can be arranged on the stop 32 of the transmission element 28 for example, and namely so that it protrudes in the axial direction A towards the stop element 22. A second force limiter is therefore provided between the torsion rod 26 and the spool body 12. A force limitation can thereby by provided initially by means of cutting.

A force limitation could also occur initially by deformation or similar.

A third embodiment is shown in FIGS. 9 to 13. This differs from the second embodiment in that the stop 34 provided on the transmission element 28 protrudes in the radial direction.

The stop element 22 is a cover 38 here, which is fastened to the spool body 12 by means of fastening means 40. The fastening means 40 are shown diagrammatically in FIG. 10.

When a tractive force acts on the belt spool 12 when the disc 16 is blocked, the shear pins which connect the disc 16 with the belt spool 12 break, for which reason the spool body 12 can rotate relative to the disc 16, and namely until the stop 34 of the stop element 22 lies against the stop 32 of the transmission element 28 after a rotation of approximately 300°. The first end 29 of the torsion rod 26 is thus coupled to the spool body 12 so as to be locked against relative rotation. If a tractive force then occurs in the belt webbing which is greater than the moment of resistance of the torsion rod 26, a force limitation occurs by means of torsion.

A cutting member could again be provided (not shown), in order to initially provide a force limitation by means of machining. A force limitation could also equally well take place initially by means of deformation.

Figure 14:
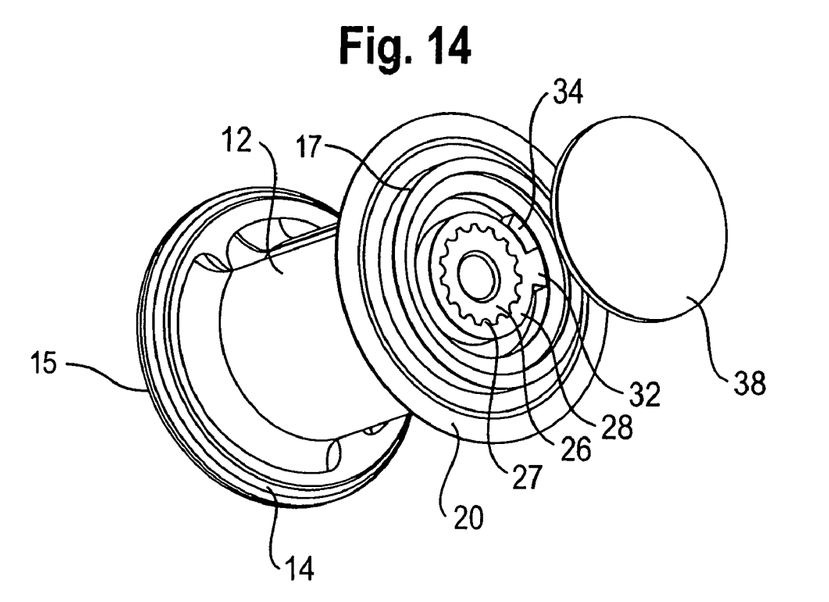
FIG. 14 shows a perspective view of a belt spool according to the invention in accordance with a fourth embodiment.
Figure 15:
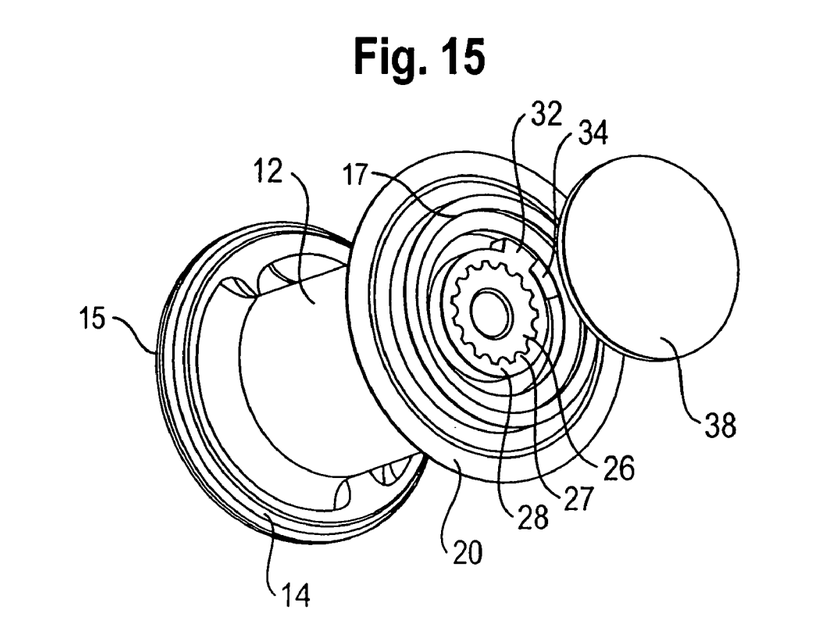
FIG. 15 shows a further perspective view of the belt spool of FIG. 14.
Figure 16:
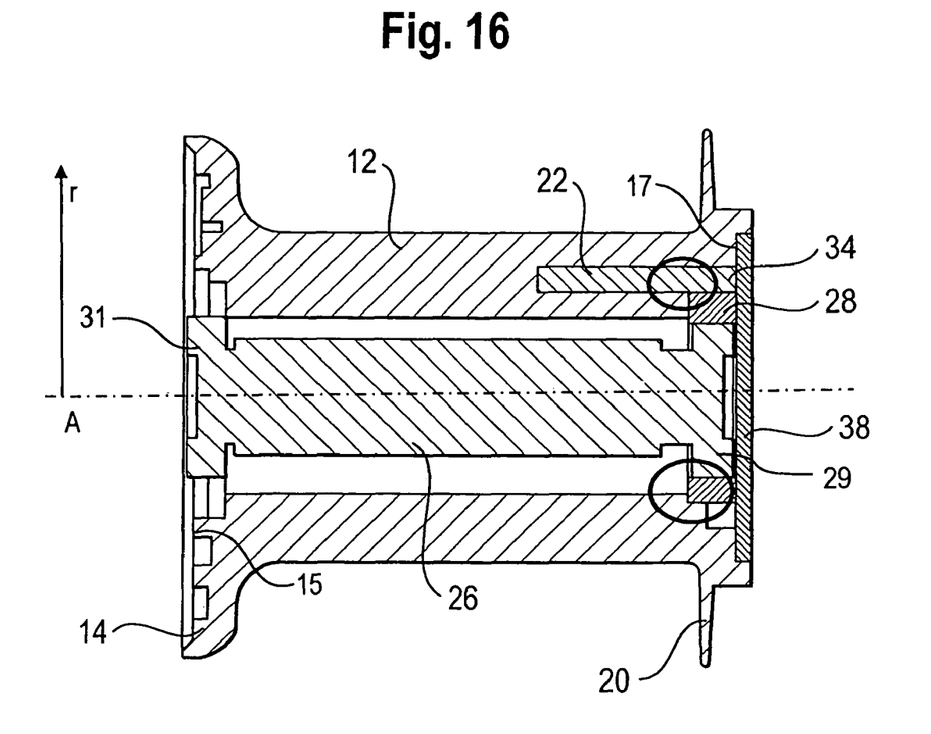
FIG. 16 shows a view of the belt spool of FIGS. 14 and 15.

A fourth embodiment is shown in FIGS. 14 to 16. This differs from the third embodiment only in that the stop 34 is not a part of the cover 38, but rather is a rod which is inserted into a mounting 39 in the belt spool 12, and in particular is pressed into the belt spool 12 or is cast onto the belt spool 12.

All embodiments have in common the fact that the torsion rod is only connected after a particular period of time. Initially, a force limitation can take place by machining in the inner thread (embodiment 1) or by machining, deformation etc. (embodiments 2 to 4).

The invention claimed is:
1. A belt spool comprising:
a spool body (12),
a torsion rod (26) having a first end (29) and a second end (31),
said torsion rod (26) being provided with a torque transmission profile (27) at said first end (29), in order to be coupled with said spool body (12),
a transmission element (28) being connected with said torque transmission profile (27) of said torsion rod (26), and a stop element (22) cooperating with said transmission element (28) and being coupled with said spool body (12),
said transmission element (28) allowing a rotation of said belt spool (12) relative to said torsion rod (26) to a limited extent without twisting of the torsion rod (26) first.

2. The belt spool according to claim 1, wherein said torque transmission profile (27) is a multi-groove profile.

3. The belt spool according to claim 1, wherein said spool body (12) comprises a mounting (21) and said stop element (22) comprises an outer side (23), said stop element (22) being provided with a multi-groove profile at said outer side (23) and being inserted into said mounting (21).

4. The belt spool according to claim 1, wherein said spool body (12) has an end side (17) and said stop element (22) is a cover (38) which is mounted on said end side (17) of said spool body (12).

5. The belt spool according to claim 1, wherein said spool body (12) comprises a mounting (39) and said stop element (22) is a rod which is inserted into said mounting (39).

6. The belt spool according to claim 1, wherein said transmission element (28) is a threaded bush which is provided with an outer thread (30) engaging said stop element (22).

7. The belt spool according to claim 1, wherein said transmission element (28) has a stop (32) and said stop element (22) has a stop (34), said stop (32) being able to cooperate with said stop (34).

8. The belt spool according to claim 7, wherein said stop (32, 34) protrudes in an axial direction (A).

9. The belt spool according to claim 7, wherein said stop (32, 34) protrudes in a radial direction (r).

10. The belt spool according to claim 1, wherein said torsion rod (26) is a first force limiter, said transmission element (28) being a second force limiter provided between said torque transmission profile (27) of said torsion rod (26) and said spool body (12).

11. The belt spool according to claim 10, wherein said second force limiter includes a self-tapping thread.

12. The belt spool according to claim 10, wherein said second force limiter is formed by a cutting member (36) which machines material.

13. The belt spool according to claim 1, wherein said spool body (12) and said stop element (22) rotate relative to said torsion rod (26) and said transmission element (28), said stopping element (22) preventing rotation of said spool body (12) and said stop element (22) relative to said transmission element (28) after said spool body (12) and said stop element (22) rotate through a predetermined rotation range relative to said torsion rod (26) and said transmission element (28).

14. The belt spool according to claim 1, wherein said transmission element (28) has a first surface spaced from a second surface of said stop element (22) during rotation of said belt spool (12) relative to said torsion rod (26), said first surface engaging said second surface to prevent rotation of said spool body (12) relative to said first end (29) of said torsion rod (26).

* * * * *